United States Patent
Steinberg et al.

(10) Patent No.: US 9,827,858 B2
(45) Date of Patent: Nov. 28, 2017

(54) ARRANGEMENT FOR THE CURRENT SUPPLY OF ELECTRICAL USERS ARRANGED IN A MOTOR VEHICLE

(71) Applicant: NEXANS, Paris (FR)

(72) Inventors: Helmut Steinberg, Stoernstein (DE); Frank Schroeer, Weiden (DE)

(73) Assignee: NEXANS, Paris (FR)

( * ) Notice: Subject to any disclaimer, the term of this patent is extended or adjusted under 35 U.S.C. 154(b) by 711 days.

(21) Appl. No.: 13/970,885

(22) Filed: Aug. 20, 2013

(65) Prior Publication Data
US 2014/0054958 A1 Feb. 27, 2014

(30) Foreign Application Priority Data
Aug. 27, 2012 (EP) ..................... 12306023

(51) Int. Cl.
*B60L 11/18* (2006.01)
*B60L 1/06* (2006.01)

(52) U.S. Cl.
CPC ................ *B60L 11/18* (2013.01); *B60L 1/06* (2013.01); *B60L 11/1877* (2013.01); *Y02T 10/705* (2013.01); *Y02T 10/7005* (2013.01)

(58) Field of Classification Search
CPC combination set(s) only.
See application file for complete search history.

(56) References Cited

U.S. PATENT DOCUMENTS

2008/0182466 A1* 7/2008 Wegner-Donnelly .. B63H 23/24
440/84

FOREIGN PATENT DOCUMENTS

| DE | 3609704 | | 9/1987 | |
|---|---|---|---|---|
| DE | 3616649 | | 11/1987 | |
| DE | 3710642 | | 10/1988 | |
| JP | 2006290227 | * | 4/2005 | ............ B60R 16/02 |
| JP | 2006290227 | | 10/2006 | |
| JP | 2006290227 A | * | 10/2006 | ............ B60R 16/02 |

* cited by examiner

*Primary Examiner* — Rexford Barnie
*Assistant Examiner* — Swarna N Chowdhuri
(74) *Attorney, Agent, or Firm* — Sofer & Haroun, LLP

(57) ABSTRACT

An arrangement is provided for the current supply of electrical users arranged in a motor vehicle. At least two mechanically stable and electrically conductive support elements (4, 5) are arranged in the bottom portion of the motor vehicle (1), where the support elements (4, 5) extend essentially over the entire length of the motor vehicle (1). The two support elements (4, 5) are at one end thereof, each electrically conductively connected to one of the poles of the voltage source (2) and have over their entire length contact points (6, 7) which are separate from each other for connection of the users.

4 Claims, 1 Drawing Sheet

ARRANGEMENT FOR THE CURRENT SUPPLY OF ELECTRICAL USERS ARRANGED IN A MOTOR VEHICLE

RELATED APPLICATION

This application claims the benefit of priority from European Patent Application. No. 12 306 023.8, filed on Aug. 27, 2012, the entirety of which is incorporated by reference.

BACKGROUND

Field of the Invention

The invention relates to an arrangement for current supply of electrical users arranged in a motor vehicle, wherein at least one electrical voltage source is mounted in the motor vehicle, by means of which the users are electrically conductively connected, and wherein electrically conductive guide members are arranged in the bottom part of the motor vehicle, which at one of their ends are each electrically conductively connected to one of the poles of the voltage source.

Such an arrangement is disclosed, for example, in JP 2006 290 227 A.

Description of the Related Art

The arrangement constitutes international prior art and is present essentially in all motor vehicles, in the following called "vehicle" for short. At least one battery is mounted in the vehicle which, especially in the case of electric vehicles, may also be rechargeable. In the following, the word "battery" is used instead of the word "voltage source."

In accordance with conventional technology, the electrical lines mounted in a vehicle are combined into a unit in so-called wiring harnesses. Conventional wiring harnesses are disclosed, for example, in printed documents DE 37 10 642 A1, DE 36 09 704 A1 and DE 36 16 649 A1. The electrical users of a vehicle are connected through the electrical lines to the battery of the vehicle.

The electrical conductors of a wiring harness have different lengths and as a rule, also different cross sections. Because of the, in most cases, large number of individual conductors to be connected into a unit, not only the manufacture of a wiring harness is complicated, but also its placement in the vehicle is complicated if, for example, users present in the rear portion of the vehicle are to be connected to the battery.

JP 2006 290 227 A describes an arrangement, which as a relatively short unit, is mounted in the area of the instruments of a vehicle and projects into the intermediate space between the driver's seat and the passenger seat. A structural component is slidably arranged on two electrically conductive guide members connected to a voltage source and mounted at the bottom of the vehicle. It serves, for example, for connecting a CD-device or a DVD-device arranged in the instrument panel. The structural component may be locked in a predetermined position by means of a lever.

3. Objects and Summary

The invention is based on the object of further developing the above described arrangement in such a way so that the users mounted in a vehicle can be connected to the battery in a simpler manner.

In accordance with the invention, this object is met in that the guide members are in double function electrical conductors on the one hand, and support elements on the other hand, wherein the support elements extend in the motor vehicle in a length which is suitable for their function as mechanically stable supports for the superstructure of the motor vehicle, and that the support elements have contact points in their function as electrical conductors over their entire length, which are separated from each other for the electrically conductive connection of the users of the motor vehicle.

In this arrangement, two support elements are used which, on the one hand, serve as mechanically stable support members for the superstructure of a vehicle and, on the other hand, as a type of current rails for the electrically conductive connection of the user to the battery of the vehicle. The support elements have contact points over their entire length to which individual conductors leading to the users, or also two or more conductors which have been previously combined and have a relatively short length, can be connected, wherein the length essentially depends only on the distance of the users from one of the contact points or of two complementary contact points of the support elements. In this connection, the position of the battery within the vehicle is of no significance. Since the support elements extend over the entire length of the vehicle, particularly in the rear portion of the vehicle, significant simplifications are obtained because also the users located there can be connected to the contact points of the support elements through relatively short lines. This advantage is particularly significant if the battery of the vehicle is mounted in the engine compartment, i.e., a far distance away from the rear portion of the vehicle.

BRIEF DESCRIPTION OF THE DRAWINGS

An embodiment of the subject matter of the invention is illustrated in the drawings.

In the drawing.

DETAILED DESCRIPTION

The support elements used in the arrangement in accordance with the invention have a double function. On the one hand, they are mechanically stable supports for the superstructure of the vehicle and, on the other hand, they are electrical conductors in the form of "current rails" for the electrically conductive connection of the users. Accordingly, on the one hand, the support elements must be mechanically sufficiently strong and, on the other hand, they must have a sufficient electrical conductivity and a sufficiently large cross section for transmitting a current which is sufficient for all connectable users. It is possible in this connection to construct the support elements as "current rails" for high voltage and to connect the users depending on their voltage requirement possibly through transducers to the users. In this concept, the support elements may be, for example, of aluminum or an aluminum alloy, copper or a copper alloy, or of steel. For reasons of weight, aluminum or an aluminum alloy, particularly with magnesium as the alloying element, can advantageously be used for the support elements.

The support elements are surrounded circumferentially and over their entire length by an insulation through which they are covered in a touch-proof manner relative to the superstructure of the vehicle. Suitable insulating materials are, for example, polyethylene, polyurethane, polyamide, polypropylene and ceramic materials.

Figure 1:
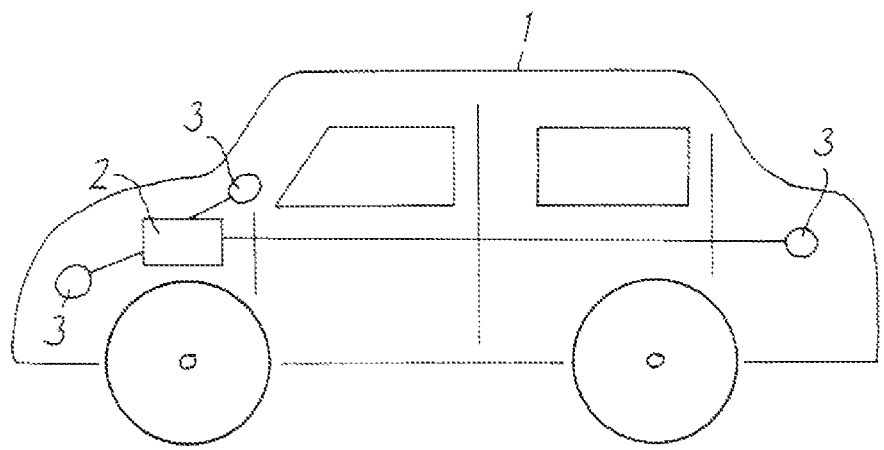
FIG. 1 is a schematic side view of a vehicle.

The vehicle 1 schematically shown in FIG. 1 is supposed to be a passenger vehicle. In the illustrated embodiment, the vehicle has a battery 2 arranged in the engine compartment and a plurality of electrical users 3 of which only three are shown as circles at three different positions in the vehicle 1. All users 3 are electrically conductively connected to the battery 2 through insulated conductors. The vehicle 1 may also be a type of vehicle different from a passenger car, and it may also have fewer than 4 wheels. For example it may also be a transporter or a bus.

Figure 2:
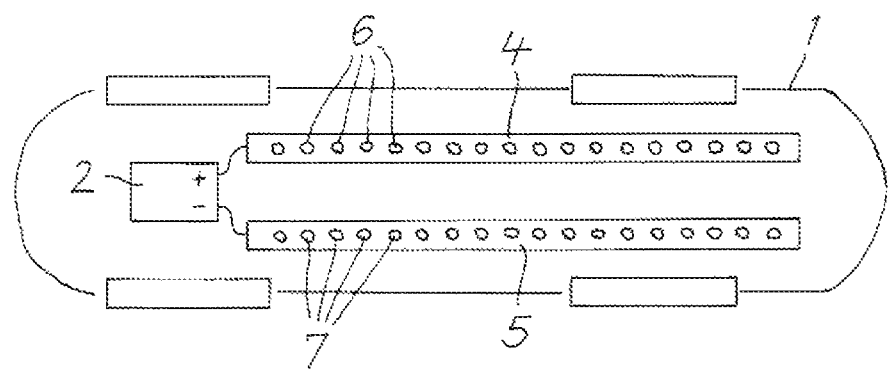
FIG. 2 is also a schematic illustration of an arrangement according to the invention.

In FIG. 2 only the bottom portion of the vehicle 1 is schematically illustrated. For clarity's sake, any superstructure is omitted. In the illustrated embodiment two support elements 4 and 5 mounted in this bottom portion extend essentially over the entire length of the vehicle 1. It is basically also possible to arrange more than two support elements in the vehicle 1 which may be electrically connected with each other in a suitable manner. Each of the support elements 4 or 5 is at one end connected to one of the poles of the battery 2.

In the illustrated embodiment, the battery 2 is arranged in the area of an end of the motor vehicle 1. As illustrated, the support elements 4 and 5 can each be constructed as a single piece. For example, if the battery 2 is mounted in the middle portion of the vehicle 1, the support elements 4 and 5 may also each be composed of two parts which extend on different sides of the battery 2, each up to an end portion of the vehicle 1. In accordance with the above description, the support elements 4 and 5 are composed of mechanically stable and electrically conductive material.

The support elements 4 and 5 are equipped over their entire length with contact points 6 and 7 which are separate from each other and to which the electrical conductors leading to the users 3 can be connected directly or indirectly. The contact points 6 and 7 may be constructed as contact points which are conventional in electrical connection technology. Accordingly, they may be, for example, structural components for a plug-type connection, a threaded connection or a welded or soldered connection. At the ends of the conductors to be connected, structural components each are mounted which can be connected in a simple manner to the structural components mounted at the contact points 6 and 7 of the support elements 4 and 5.

The conductors leading to the users 3 may be connected directly individually to two complementary contact points 6 and 7 of the support elements 4 and 5 having different polarities. It is also possible to combine two or more conductors and to connect them together directly to two complementary contact points 6 and 7. This particularly lends itself for connecting the larger number of users 3 located in the rear portion or in the engine compartment of the vehicle 1.

An indirect connection of the conductors to the contact points 6 and 7 exists if, for example, transducers or other electrical or electronic devices must be intermediately connected which, in turn, are connected directly to the corresponding contact points 6 and 7. The conductors are then connected to such devices. In this sense, the arrangement can also be laid out for multiple voltage onboard networks such as for example, 12V, 24V or 48V, but also 600V. In this regard, the different voltages can also be picked up by different support elements (current rails) if appropriate connections to the battery 2 are provided.

The invention claimed is:

1. Arrangement for current supply of electrical users arranged in a motor vehicle, said arrangement comprising:
   at least one electrical voltage source, said voltage source being mounted in the motor vehicle,
   wherein the electrical users are electrically conductively connected by insulated conductors to the voltage source, and
   wherein electrically conductive guide members are arranged in the bottom portion of the motor vehicle, and
   wherein the electrically conducted guide members are, at their one end, electrically conductively connected to one of the poles of the voltage source,
   wherein the guide members carry out a double function and functions as both electrical conductors to supply power to electrical users on the one hand, and support members to serve as mechanically stable support members for a superstructure of said motor vehicle on the other hand, said guide members extending in the motor vehicle over a length sufficient to span the superstructure of the motor vehicle, said guide elements being surrounded circumferentially, over their entire length, by an insulation so to be insulted from the superstructure of the vehicle, and
   wherein said guide elements, in their function as electrical conductors, have, over their entire length, contact points which are separate from each other so that said insulated conductors may be attached to said contact points for electrically conductively connecting the electrical users of the motor vehicle to said voltage source.

2. Arrangement according to claim 1, wherein the support elements are composed of aluminum or an aluminum alloy.

3. Arrangement according to claim 1, wherein the support elements are of copper or a copper alloy.

4. Arrangement according to claim 1, wherein the support elements are composed of steel.

* * * * *

UNITED STATES PATENT AND TRADEMARK OFFICE
CERTIFICATE OF CORRECTION

PATENT NO. : 9,827,858 B2
APPLICATION NO. : 13/970885
DATED : November 28, 2017
INVENTOR(S) : Helmut Steinberg and Frank Schroeer It is certified that error appears in the above-identified patent and that said Letters Patent is hereby corrected as shown below:

Column 4, Claim 1, Line 37:
The word "insulted" between the words "be" and "from" should read "insulated"

Signed and Sealed this
Twenty-second Day of May, 2018

Andrei Iancu
*Director of the United States Patent and Trademark Office*